United States Patent [19]

Allcock et al.

[11] Patent Number: 4,656,017

[45] Date of Patent: Apr. 7, 1987

[54] PYRIDINE PHOSPHONITRILIC HALIDE TRIMER PROCESS

[75] Inventors: Harry R. Allcock, State College, Pa.; S. James Stinnett, Baton Rouge, La.; Joseph B. Tedder, Jr., Baton Rouge, La.; J. Robert Adams, Jr., Baton Rouge, La.

[73] Assignee: Ethyl Corporation, Richmond, Va.

[21] Appl. No.: 756,799

[22] Filed: Jul. 19, 1985

[51] Int. Cl.⁴ .............................................. C01B 25/10
[52] U.S. Cl. ....................................................... 423/300
[58] Field of Search ........................................ 423/300

[56] References Cited

U.S. PATENT DOCUMENTS 4,567,028  1/1986  Tanino et al. ......................... 423/300

OTHER PUBLICATIONS

Allcock, Phosphorus–Nitrogen Compounds, Academic Press (1972), pp. 316–321.

Sulkowski et al., Chem. Stos. 26 (2), 245–252 (1982).
Holmes et al., Inorg. Chem. 2, No. 3, Jun. 1963.
Holmes et al., J. Am. Chem. Soc. 80, 2980, Jun. 1958.

Primary Examiner—John Doll
Assistant Examiner—Wayne A. Laugel
Attorney, Agent, or Firm—Donald L. Johnson; John F. Sieberth; J. D. Odenweller

[57] ABSTRACT

Cyclic phosphonitrilic halides are formed rapidly and in high yield in a controllable multi-step process including the step of reacting a nitrogenous base (e.g. pyridine) with a phosphorus tetrahalide (e.g. phosphorus pentachloride) in a suitable inert liquid reaction medium (e.g. monochlorobenzene) to form a complex and in a subsequent step reacting this complex with an ammonium halide (e.g. ammonium chloride) at a temperature above about 90° C. up to the reflux temperature of the reaction medium to form cyclic phosphonitrilic halides, mainly trimer.

20 Claims, No Drawings

PYRIDINE PHOSPHONITRILIC HALIDE TRIMER PROCESS

BACKGROUND OF THE INVENTION

Cyclic phosphonitrilic halides can be reacted with alkali metal alkoxides and aryloxides to form derivatives that can be used as hydraulic fluids or as plasticizers for high molecular weight polyphosphazenes. The most common cyclic phosphonitrilic chloride is the trimer. The main use for trimer is in the manufacture of high molecular weight substantially linear phosphonitrilic chloride. The high molecular weight polymers can be obtained by merely heating the purified trimer at about 220°–300° C. for a period of 12–48 hours. Preferably the polymerization is conducted in the presence of a very small amount of a Lewis Acid catalyst, e.g. $AlCl_3$, $BCl_3$ and the like. The linear high molecular weight phosphonitrilic chloride can be substituted by reaction with alkali metal alkoxides and/or aryloxides to form elastomers having very useful physical properties. These elastomers can be compounded and cured to form useful articles of manufacture. The conventional method for making cyclic phosphonitrilic halides is to react phosphorus pentahalide with an excess of ammonium halide in a suitable liquid reaction medium (e.g. monochlorobenzene) at a temperature of about 120°–130° C. This reaction takes several hours to complete and yields a mixture that is about 75–80% trimer. A process has been reported by W. Sulkowski et al., Chem. Stos. 26 (2) p. 245–252 (1982), in which pyridine is added to a well-ground mixture of phosphorus pentachloride and ammonium chloride causing the temperature to rise sharply to 180° C. causing strong boiling presumeably of the pyridine. The reaction is complete in minutes giving a high yield of cyclic phosphonitrilic chloride, mainly trimer and tetramer. The reaction can also be conducted in sym-tetrachloroethane using quinoline as the nitrogenous base. Although this process is very rapid and gives high yields of cyclics, it is not practical on a large scale because the large exotherm over such a short reaction period leads to an uncontrollable reaction.

SUMMARY OF THE INVENTION

It has now been discovered that the reaction of phosphorus pentahalide, ammonium chloride and pyridine to produce cyclic phosphonitrilic chlorides proceeds in two steps and that by conducting these steps sequentially the process can be readily controlled while still giving high yields. The first stage involves the reaction of phosphorus pentachloride with pyridine in an exothermic reaction to form a complex. This reaction proceeds at rather moderate temperatures. In a subsequent stage this complex is reacted with ammonium chloride in a second exothermic reaction which initiates at a higher temperature to form cyclic phosphonitrilic chlorides, mainly trimer.

DESCRIPTION OF THE PREFERRED EMBODIMENTS

A preferred embodiment of the invention is a process for making cyclic phosphonitrilic halide, said process comprising
(A) reacting a phosphorus pentahalide with a nitrogenous base selected from pyridine, substituted pyridines and mixtures thereof to form a complex and
(B) reacting said complex with ammonia or ammonium halide at a temperature above about 90° C. to form a cyclophosphonitrilic halide.

Although any phosphorus pentahalide can be used including both phosphorus pentachloride and phosphorus pentabromide and mixtures thereof, the preferred phosphorus reactant is phosphorus pentachloride or the combination of phosphorus trichloride and chlorine which will produce phosphorus pentachloride. In the following description of the preferred embodiments, phosphorus pentachloride will be referred to but it is understood that phosphorus pentabromide can be substituted for all or part of the phosphorus pentachloride.

Any nitrogenous base which includes in its structure a pyridine ring can be used. Examples of these are pyridine, alpha-picoline, β-picoline, gamma-picoline, quinoline, isoquinoline, 7-methylquinoline, 2,3-dimethylquinoline, lepidine, quinaldine, acridine, quinolinic acid, nicotinic acid, 2-aminopyridine, 2-phenylpyridine and the like including mixtures thereof. The most preferred nitrogenous base is the compound pyridine. The foregoing nitrogenous bases are referred to collectively as pyridine and substituted pyridines. In the following discussion pyridine will be used for exemplification but it is understood that any of the other nitrogenous bases may be substituted for pyridine but not necessarily with equal results.

The amount of pyridine is preferably at least 0.75 moles per mole of phosphorus pentachloride and still more preferably at least 0.9 moles per mole of phosphorus pentachloride. There is no real upper limit but increasing the amount of pyridine above about 3.0 moles per mole of phosphorus pentachloride does not appear to improve reaction rate or yield so a practical range is about 0.75–4.0 moles of pyridine per mole of phosphorus pentachloride and more preferably about 2–3 moles of pyridine per mole of phosphorus pentachloride.

The reaction of phosphorus pentachloride and pyridine is preferably conducted by slowly adding the pyridine to a slurry of finely divided phosphorus pentachloride in a suitable inert liquid reaction medium. Good results have been obtained using halogenated hydrocarbons as the reaction medium, especially chlorohydrocarbons such as chloroform, carbon tetrachloride, 1,1-dichloroethane, 1,2-dichloroethane and the like. More preferably the reaction medium should have a boiling point of at least 90° C. for reasons that will be apparent later. Most preferably the reaction medium will have a normal boiling point of about 90°–200° C. such as 1,1,2-trichloroethane, sym-tetrachloroethane, 1,1,1,2-tetrachloroethane, monochlorobenzene, 2,-chlorotoluene, 3-chlorotoluene, 4-chlorotoluene, monochloroxylenes, ortho-dichlorobenzenes, meta-dichlorobenzenes, para-dichlorobenzenes and the like. Most research has been carried out using monochlorobenzene which is the preferred solvent. Most preferably the solvent will have a boiling point of about 110°–200° C. and most preferably 120°–150° C.

A preferred amount of solvent is about 50–1,000 parts by weight solvent for each 100 parts of $PCl_5$ and more preferably about 300–800 parts per 100 parts $PCl_5$.

The reaction between phosphorus pentachloride and pyridine will initiate at ambient temperature and may be conducted at temperatures up to reflux or higher under pressure as long as ammonium chloride is not present in the reaction mixture. Temperatures may be controlled by external cooling and by controlling the rate at which pyridine is added. Generally the reaction is started at ambient temperature (e.g. 20° C.) and allowed to rise to about 70° C. over the course of the pyridine addition. A phosphorus pentachloride-pyridine complex forms which is not completely soluble in monochlorobenzene and forms a slurry.

In the next stage the slurry of PCl$_5$-pyridine complex is reacted with an ammonium halide, preferably ammonium chloride which will be used in the following discussions for illustrative purposes although ammonium bromide may be substituted for all or part of the ammonium chloride. The ammonium chloride should be finely divided and can be made in that form by adding approximately equal mole amounts of ammonia and hydrogen chloride to an inert liquid reaction media, preferably one of those referred to earlier which has a normal boiling point of at least 90° C. The amount of such solvent is not critical but is preferably about 50–1,000 parts by weight and more preferably about 200–800 parts per each 100 parts of ammonium chloride. The amount of ammonium chloride formed should be at least 0.9 up to about 5 moles per mole of phosphorus pentachloride and more preferably at least 1.0 moles per mole of phosphorus pentachloride. Still more preferably a small excess of ammonium chloride is used such as about 1.05–1.5 moles and most preferably about 1.1–1.25 moles of ammonium chloride per mole of phosphorus pentachloride.

The second stage reaction is conducted by adding the slurry of PCl$_5$-pyridine complex to the slurry of ammonium chloride at a controlled rate at a reaction temperature of at least 90° C. up to about 200° C. or more depending upon the boiling point of the reaction medium. More preferably the reaction temperature is at least 110° C. up to reflux and most preferably about 120° C. up to reflux. Mixing of the phosphorus pentachloride-pyridine complex and the ammonium chloride at temperatures substantially below 90° C. should be avoided because the complex does not react or reacts only sluggishly with ammonium chloride at temperatures below 90° C. and could lead to a build-up of unreacted reactants which could react violently when the temperature increases above about 90° C.

The time required for the second stage is a factor of both scale and capacity to remove the heat of reaction by external cooling and/or solvent reflux.

Following completion of the second stage the cyclic products may be recovered by conventional methods. One preferred method is to water wash the cooled reaction mixture, separate the organic phase and crystallize cyclics from the organic phase. The crystallized cyclics are predominantly trimer.

In another mode of conducting the process both the ammonium chloride and phosphorus pentachloride in a mole ratio of about 0.9–5:1.0, more preferably 1.05–1.5:1.0 and most preferably 1.1–1.25:1.0 are mixed in an inert liquid reaction medium having a boiling point above about 90° C. and most preferably in the range of 120°–150° C. and of the type previously described. Pyridine or one of the substituted pyridines is then added to the slurry at a controlled rate such that the temperature does not substantially exceed about 70° C. Functionally defined the temperature should be such that the pyridine or substituted pyridine will react with the phosphorus pentachloride in the presence of ammonium chloride to form a pyridine-phosphorus pentachloride complex but below the temperature at which this complex will react with ammonium chloride. Thus the reaction is still a two-stage process even though both PCl$_5$ and NH$_4$Cl are charged prior to feeding pyridine.

All reactant ratios are the same as in the previously described embodiment. After the pyridine has been charged and the pyridine-PCl$_5$ complex formed, the reaction mixture is heated to a temperature which will initiate the second stage reaction (approximately 90° C.). The second exothermic reaction will raise the temperature still further, generally up to the reflux temperature of the solvent which serves to assist in removing heat of reaction.

When the second stage reaction subsides, the mixture is preferably heated for a short period to make sure the reaction is complete and then cooled. Product can be recovered by conventional methods such as a water wash followed by crystallization.

The following examples will illustrate how the process can be conducted:

EXAMPLE 1

To a stirred reaction vessel was charged 1,894 grams of dry monochlorobenzene and 495 grams of reagent grade PCl$_5$. Then 499 grams of pyridine was slowly added, the first half over a 20 minute period and the last half in one addition. During addition of the first 200 grams of pyridine an exothermic reaction occurred with the maximum temperature reaching 57° C.

In a second stirred reaction vessel fitted with a reflux condenser was charged 852 grams of monochlorobenzene and 160 grams of finely divided dry NH$_4$Cl. The contents of the second flask were heated to monochlorobenzene reflux (127°–130° C.) and the contents of the first reaction vessel were added gradually over a 45 minute period. During this time the reaction mixture was at reflux due to the heat of reaction. Following this, 937 grams of monochlorobenzene was added to the first reaction vessel containing the PCl$_5$-pyridine complex to rinse residual solid into the second reaction vessel. External heat was then applied to maintain the reaction at reflux (126°–130° C.) for an additional hour. The reaction mixture was then allowed to cool to ambient temperature (20° C.) and 1,181 grams of water was added and the mixture stirred for 10 minutes following which the phases were allowed to separate. The organic phase (3,037 grams) was recovered. Analysis by $^{31}$P NMR indicated that the organic product contained 91.3 weight percent of the theoretical phosphorus charged to the reaction and that the product was 81.6 weight percent trimer, 4.1 weight percent tetramer and the balance higher phosphazenes.

EXAMPLES 2–8

A series of reactions were conducted similar to Example 1 except for differences indicated in the following table:

| Example | Pyridine/PCl$_5$ Ratio | Feed Time (min.) | Cook Time (min.) | Cook Temp. (°C.) | Analysis Trimer % | Tetramer % |
|---|---|---|---|---|---|---|
| 2 | 2.8 | 45 | 0 | | 75.2 | 2.2 |
| 3 | 2.8 | 40 | 60 | 107–127 | 81.0 | 1.7 |
| 4 | 2.8 | 45 | 60 | 126–132 | 81.7 | 4.1 |

| Example | Pyridine/PCl$_5$ Ratio | Feed Time (min.) | Cook Time (min.) | Cook Temp. (°C.) | Analysis Trimer % | Tetramer % |
|---|---|---|---|---|---|---|
| 5 | 1.2 | 20 | 60 | 132–123 | 67.5 | 4.4 |
| 6 | 1.2 | 35 | 60 | 126–131 | 76.7 | 3.3 |
| 7 | 1.2 | 25 | 90 | 132–129 | 75.9 | 4.3 |
| 8 | 2.8 | 15 | 60 | 125–133 | 81.9 | 3.7 |

EXAMPLE 9

In a stirred reaction vessel fitted with a reflux condenser was placed 495 grams PCl$_5$, 157 grams NH$_4$Cl and 1,295 grams of dry monochlorobenzene. The NH$_4$Cl was vacuum oven dried at 60° C. for 12 hours. Then 500 grams of pyridine was added slowly, the first half over a 20 minute period and the final half added all at once. During addition of the first half the temperature in the vessel rose from ambient (22° C.) to a maximum of 65° C. After about 200 grams of pyridine had been charged the exotherm reaction appeared to cease and the temperature began to fall. After completion of the pyridine feed external heat was applied to raise the temperature to 90° C. at which point a second exothermic reaction initiated and the external heat was removed. The exotherm of the reaction raised the temperature to reflux (132° C.) within 5 minutes after which the temperature began to fall. External heat was applied once again to maintain reflux for 1 hour. The reaction mixture was then allowed to cool to ambient temperature and 1,211 grams of water was added to dissolve pyridine hydrochloride and any excess ammonium chloride. The mixture was stirred for 10 minutes and then the phases permitted to separate. The organic phase was recovered. Analysis by $^{31}$P NMR showed that the organic product contained 98.6% of the phosphorus charged and that the product in the organic phase was 84.2% cyclic phosphonitrilic chloride trimer and 4.3% cyclic tetramer.

EXAMPLES 10–14

These examples were conducted in the same manner as Example 9 with the following differences:

| Example | Pyridine/PCl$_5$ Ratio | Cook Time (min.) | Cook Temp. (°C.) | Analysis Trimer % | Tetramer % |
|---|---|---|---|---|---|
| 10 | 2.8 | 0 |  | 77.7 | 3.1 |
| 11 | 2.8 | 60 | 126–132 | 84.2 | 4.3 |
| 12 | 2.8 | 60 | 107–110 | 80.0 | 4.2 |
| 13 | 2.8 | 60 | 126–132 | 81.7 | 3.3 |
| 14 | 2.8 | 60 | 123–136 | 79.7 | 3.7 |

The above described invention permits the synthesis of cyclic phosphonitrilic chloride trimer in high yield at much increased reaction rates and much higher concentrations than in previously known methods. The process provides for a controllable reaction when pyridine is used in the synthesis whereas following the prior art pyridine methods an uncontrollable dangerous reaction was encountered.

We claim:

1. A process for making cyclic phosphonitrilic halide, said process comprising
   (A) reacting a phosphorus pentahalide with at least 0.75 moles per mole of phosphorus pentahalide of a nitrogenous base selected from pyridine, substituted pyridines and mixtures thereof in an inert liquid reaction medium in the absence of ammonia or ammonium halide to form a complex and
   (B) in a subsequent step reacting said complex with ammonia and ammonium halide at a temperature above about 90° C. to form a cyclophosphonitrilic halide.

2. A process of claim 1 comprising
   (A) reacting phosphorus pentachloride with at least 0.75 moles per mole of phosphorus pentachloride of a nitrogenous base selected from pyridine, substituted pyridines and mixtures thereof in an inert liquid reaction medium in the absence of ammonia or ammonium halide to form a complex and
   (B) in a subsequent step reacting said complex with ammonium chloride to form cyclic phosphonitrilic chloride.

3. A process of claim 2 wherein said nitrogenous base is pyridine.

4. A process of claim 1 conducted in an inert liquid reaction medium having a normal boiling point above about 90° C.

5. A process of claim 4 wherein said reaction medium is a halohydrocarbon.

6. A process of claim 5 wherein said halohydrocarbon is a chlorohydrocarbon.

7. A process of claim 6 wherein said chlorohydrocarbon is monochlorobenzene.

8. A process of claim 7 comprising
   (A) reacting about 1 mole part phosphorus pentachloride with about 0.75–4 mole parts of pyridine in a chlorobenzene reaction medium in the absence of ammonia or ammonium halide to form a complex,
   (B) in a subsequent step adding said complex and said chlorobenzene to a mixture of about 1.05–1.5 mole parts of ammonium chloride in chlorobenzene at a temperature of about 110° C. up to reflux to form mainly cyclic phosphonitrilic chloride trimer.

9. A process for making cyclic phosphonitrilic halide, said process comprising
   (A) forming a mixture of ammonium halide and phosphorus pentahalide in an inert liquid reaction medium,
   (B) adding at least 0.75 moles per mole of phosphorus pentahalide of a nitrogenous base selected from pyridine, substituted pyridines and mixtures thereof to said mixture of ammonium halide and phosphorus pentahalide at a controlled rate such that the reaction temperature does not exceed about 70° C. and (C) after completion of the nitrogenous base addition, raising the temperature of the reaction mixture to a temeprature which initiates a second exothermic reaction which forms cyclic phosphonitrilic halide.

10. A process of claim 9 wherein said ammonium halide is ammonium chloride and said phosphorus pentahalide is phosphorus pentachloride.

11. A process of claim 10 comprising
(A) forming a mixture of about 0.9–5 moles of ammonium chloride and about 1.0 mole of phosphorus pentachloride in an inert liquid reaction medium having a normal boiling point above about 90° C.,
(B) adding about 0.75–4 moles of pyridine to said mixture of ammonium chloride and phosphorus pentachloride at a controlled rate such that the temperature does not exceed about 70° C. and
(C) after completion of the pyridine addition, raising the temperature of the reaction mixture to a temperature which initiates a second exothermic reaction which forms cyclic phosphonitrilic chloride.

12. A process of claim 9 conducted in an inert liquid reaction medium having a normal boiling point of about 110°–200° C.

13. A process of claim 12 wherein said inert reaction medium is a halohydrocarbon.

14. A process of claim 13 wherein said halohydrocarbon is a chlorohydrocarbon.

15. A process of claim 14 wherein said chlorohydrocarbon is chlorobenzene.

16. A process of claim 15 comprising
(A) forming a mixture of about 1.05–1.5 moles of ammonium chloride and about 1.0 mole of phosphorus pentachloride in a chlorobenzene reaction medium,
(B) adding about 2–3 moles of pyridine to said mixture of ammonium chloride and phosphorus pentachloride at a controlled rate such that the temperature does not exceed about 70° C. and
(C) after completion of the pyridine addition, raising the temperature of the reaction mixture to a temperature which initiates a second exothermic reaction which forms cyclic phosphonitrilic chloride.

17. A process for making cyclic phosphonitrilic halide, said process comprising
(A) forming a mixture of ammonium halide and phosphorus pentahalide in an inert liquid reaction medium,
(B) mixing the composition of step (A) with at least 0.75 moles per mole of phosphorus pentahalide of a nitrogenous base selected from pyridine, substituted pyridines and mixtures thereof at a temeperature such that said nitrgoenuous base will react with said phosphorus pentahalide to form a complex but below the temperature at which said complex will react with said ammonium halide, and
(C) heating the complex of step (B) to a higher temperature which will initiate the reaction of said complex with said ammonium halide to form mainly cyclic phosphonitrilic halide trimer.

18. A process of claim 17 wherein said ammonium halide is ammonium chloride and said phosphorus pentahalide is phosphorus pentachloride and said inert liquid reaction medium is a halogenated hydrocarbon having a boiling point of at least 90° C. and said nitrogenous base is pyridine.

19. A process of claim 18 wherein the mole ratio of ammonium chloride to phosphorus pentachloride is at least 0.9 to 1 up to 5 to 1 and the amount of said pyridine is at least 0.75 moles per mole of phosphorus pentachloride.

20. A process of claim 19 wherein said halogenated hydrocarbon is chlorobenzene.

* * * * *